(12) United States Patent
Kawashima

(10) Patent No.: US 7,313,202 B2
(45) Date of Patent: Dec. 25, 2007

(54) ASYNCHRONOUS SERIAL DATA RECEIVER FOR PACKET TRANSFER

(75) Inventor: Yutaka Kawashima, Yokohama (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 948 days.

(21) Appl. No.: 10/656,252

(22) Filed: Sep. 8, 2003

(65) Prior Publication Data
US 2004/0120343 A1 Jun. 24, 2004

(30) Foreign Application Priority Data
Sep. 6, 2002 (JP) .............................. 2002-261922

(51) Int. Cl.
*H04L 27/06* (2006.01)
(52) U.S. Cl. .................................................... 375/316
(58) Field of Classification Search ................ 375/357, 375/355, 222, 219, 316–318; 326/30; 711/162; 709/200
See application file for complete search history.

(56) References Cited
U.S. PATENT DOCUMENTS

| | | | | |
|---|---|---|---|---|
| 5,422,915 A | * | 6/1995 | Byers et al. ................ | 375/357 |
| 5,661,751 A | * | 8/1997 | Johnson ....................... | 375/219 |
| 5,754,764 A | * | 5/1998 | Davis et al. ................ | 709/200 |
| 5,809,543 A | * | 9/1998 | Byers et al. ................ | 711/162 |
| 6,304,596 B1 | * | 10/2001 | Yamano et al. ............. | 375/222 |
| 6,445,731 B1 | * | 9/2002 | Yamano et al. ............. | 375/222 |
| 6,906,549 B2 | * | 6/2005 | Schoenborn et al. .......... | 326/30 |
| 6,907,096 B1 | * | 6/2005 | Lueker et al. .............. | 375/355 |

FOREIGN PATENT DOCUMENTS

JP 5-266483 10/1993

* cited by examiner

*Primary Examiner*—Don N. Vo
(74) *Attorney, Agent, or Firm*—Oblon, Spivak, McClelland, Maier & Neustadt, P.C.

(57) ABSTRACT

A receiver provides a differential signal of first and second signals as received serial data. A tracking circuit receives the received serial data and a clock signal to generate a synchronous clock signal based on the clock signal by tracking the received serial data. Then the tracking circuit generates a synchronous serial data synchronized with the synchronous clock signal. An idle detector receives the first signal and the second signal. Then the idle detector detects an idle period of the first and second signals to provide an idle signal. A memory stores the serial data in response to transitions in the synchronous clock signal. The memory provides the stored data in response to transitions in the clock signal. The memory stops storing based on a hold signal. A data protector generates the hold signal to provide the hold signal for the memory.

12 Claims, 5 Drawing Sheets

PRIOR ART

ASYNCHRONOUS SERIAL DATA RECEIVER FOR PACKET TRANSFER

CROSS REFERENCE TO RELATED APPLICATIONS

This application is based upon and claims the benefit of priority from the prior Japanese Patent Application No. P2002-261922 filed on Sep. 6, 2002, the entire contents of which are incorporated herein by reference.

BACKGROUND OF THE INVENTION

1. Field of the Invention

The present invention relates to a serial data receiver, and particularly, to an asynchronous serial data receiver for packet transfer.

2. Description of Related Art

FIG. 5 shows a serial data receiver according to a related art. This serial data receiver has a differential receiver 201, a tracking unit 203 coupled to an output terminal of the differential receiver 201, a memory 204 coupled to an output side of the tracking circuit 203, and a phase-locked oscillator 202 coupled to the tracking circuit 203 and FIFO 204.

According to the serial data receiver of the related art shown in FIG. 5, an input terminal 251 receives an input signal S1 and an input terminal 252 receives an input signal S2. Upon receiving the input signals S1 and S2, the differential receiver 201 provides, from the output terminal thereof, received serial data RX that is a differential signal of the two input signals S1 and S2. The oscillator 202 provides a phase-stabilized clock signal CKR. The tracking circuit 203 receives the clock signal CKR and received serial data RX and provides a synchronous clock signal CKW and serial data DX. The synchronous clock signal CKW is formed by tracking the clock signal CKR with the received serial data RX. In response to transition in the synchronous clock signal CKW, the FIFO 204 stores the serial data DX in an internal register, and at the same time, counts up a write address pointer. Then, in synchronization with the clock signal CKR, the FIFO 204 provides the stored data to an output terminal 253 and counts up a read address pointer.

FIG. 6 is a timing chart showing the operation of the serial data receiver according to the related art. The serial data receiver of FIG. 5 employing the differential data transfer technique sometimes causes ringing noise between time T100 and T101 when the two input signals S1 and S2 shift from an opposite-phase state to an in-phase state. The ringing noise may affect to the received serial data RX as shown in FIG. 6. For instance, the ringing noise may be overlaid on the received serial data RX. With the noise-overlaid received serial data RX, the tracking circuit 203 may provide a narrow clock signal having narrow pulse intervals as shown in FIG. 6. Since the write address counter of the FIFO 204 conducts a count-up operation based on the synchronous clock signal CKW, the narrow clock signal may cause a malfunction of the write address counter. More precisely, there will be an error between data to be stored and a write address pointer value, so that the write address pointer may point a wrong position in the FIFO 204.

SUMMARY OF THE INVENTION

An aspect of the present invention provides a serial data receiver that includes a differential receiver configured to receive first and second signals of opposite phases to provide a differential signal of the first and second signals as received serial data, a clock generator configured to generate a clock signal, a tracking circuit configured to receive the received serial data and the clock signal to generate a synchronous clock signal based on the clock signal by tracking the received serial data, the tracking circuit configured to generate a synchronous serial data synchronized with the synchronous clock signal, an idle detector configured to receive the first signal and the second signal, the idle detector configured to detect an idle period of the first and second signals to provide an idle signal, a memory configured to store the serial data in response to transitions in the synchronous clock signal, the memory configured to provide the stored data in response to transitions in the clock signal, the memory configured to stop storing based on a hold signal, and a data protector configured to receive the idle signal to generate the hold signal, the data protector configured to provide the hold signal for the memory.

Another aspect of the present invention provides a serial data receiver that includes a differential receiver configured to receive first and second signals of opposite phases to provide a differential signal of the first and second signals as received serial data, a clock generator configured to generate a clock signal, a tracking circuit configured to receive the received serial data and the clock signal to generate a synchronous clock signal based on the clock signal by tracking the received serial data, the tracking circuit configured to generate a synchronous serial data synchronized with the synchronous clock signal, an idle detector configured to receive the first signal and the second signal, the idle detector configured to detect an idle period of the first and second signals to provide an idle signal, a memory configured to receive the synchronous clock signal to store the serial data in response to transitions in the synchronous clock signal, the memory configured to provide the stored data in response to transitions in the clock signal, and a data protector configured to receive the synchronous clock signal and the idle signal to provide the memory with the synchronous clock signal, the data protector configured to stop providing the memory with the synchronous clock signal based on the idle signal.

DETAILED DESCRIPTION OF EMBODIMENTS

Figure 1:
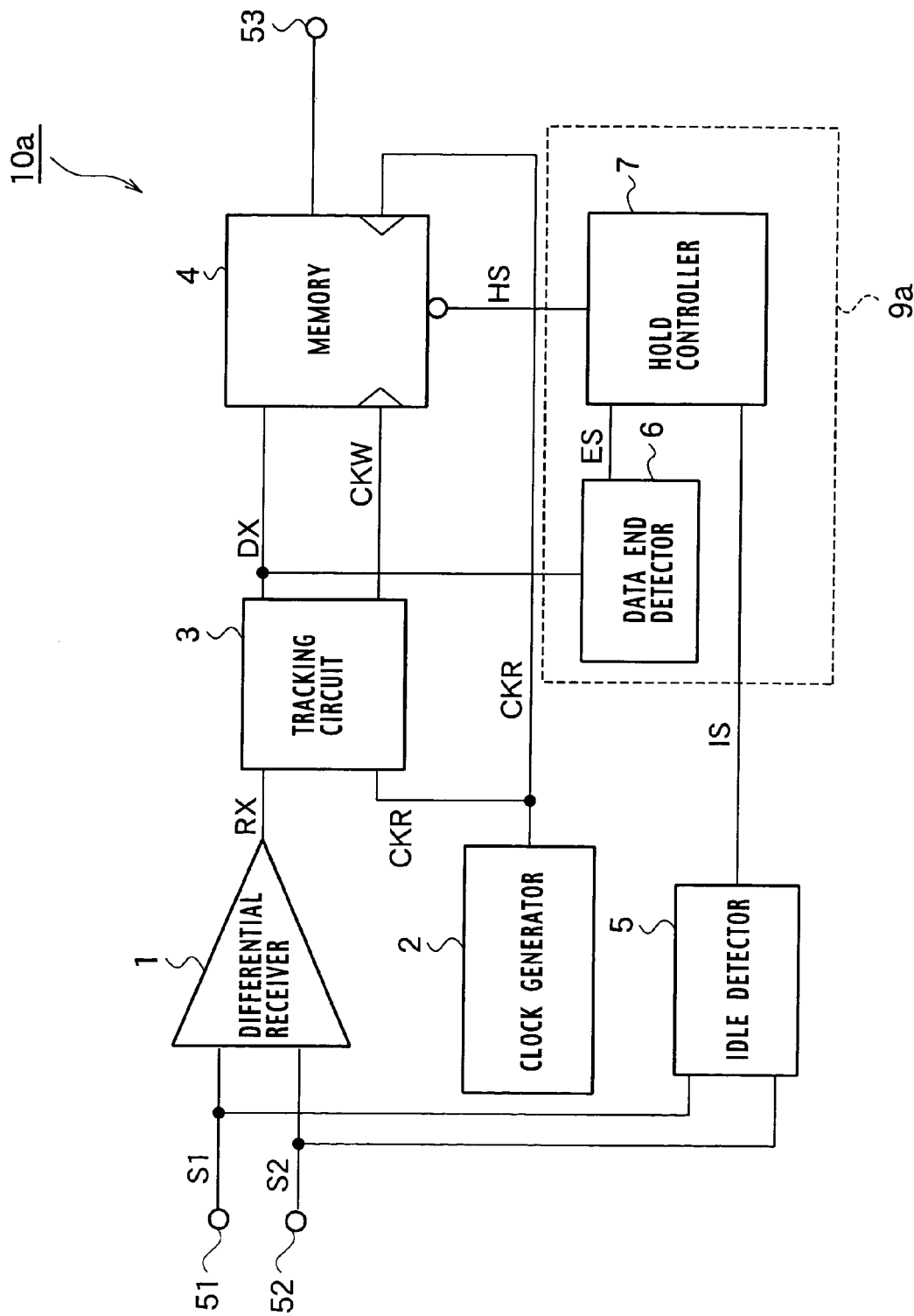
FIG. 1 shows a serial data receiver according to a first embodiment of the present invention.

Various embodiments of the present invention will be described with reference to the accompanying drawings. It is to be noted that the same or similar reference numerals are applied to the same or similar parts and elements throughout the drawings, and the description of the same or similar parts and elements will be omitted or simplified.

First Embodiment

FIG. 1 shows a serial data receiver according to a first embodiment of the present invention. Components that form the serial data receiver 10a will be explained. A differential receiver 1 receives signals S1 and S2, and when the signals S1 and S2 have opposite phases, provides a differential signal of the signals S1 and S2 as received serial data RX. A phase-locked oscillator 2 provides a clock signal CKR. A tracking circuit 3 provides a synchronous clock signal CKW by tracking the clock signal CKR with the received serial data RX, as well as serial data DX synchronized with the synchronous clock signal CKW. An idle detector 5 provides an idle signal IS when the signals S1 and S2 become in-phase. A memory (FIFO) 4 stores, in a register thereof, the serial data DX in response to transition in the synchronous clock signal CKW and provides the stored data in response to transition in the clock signal CKR. A data protector 9a provides a hold signal HS to put the FIFO 4 in an input prohibited state from the detection of an end of the serial data DX to the end of the idle signal IS.

The data protector 9a includes a data end detector 6 and a hold controller 7. The data end detector 6 detects an end of the serial data DX and provides a data end signal ES. The hold controller 7 provides the hold signal HS from the timing when the data end signal ES is provided to the timing when the idle signal IS stops.

The differential receiver 1 has a first input terminal electrically coupled to a signal input terminal 51 and a second input terminal electrically coupled to a signal input terminal 52. The idle detector 5 has a first input terminal electrically coupled to the signal input terminal 51 and a second input terminal electrically coupled to the signal input terminal 52. An output terminal of the differential receiver 1 is electrically coupled to a first input terminal of the tracking circuit 3. A first output terminal of the tracking circuit 3 is electrically coupled to a data input terminal of the FIFO 4 and to an input terminal of the data end detector 6. A second output terminal of the tracking circuit 3 is electrically coupled to a write control terminal of the FIFO 4. An output terminal of the oscillator 2 is electrically coupled to a second input terminal of the tracking circuit 3 and to a read control terminal of the FIFO 4. An output terminal of the data end detector 6 is electrically coupled to a first input terminal of the hold controller 7. An output terminal of the idle detector 5 is electrically coupled to a second input terminal of the hold controller 7. An output terminal of the hold controller 7 is electrically coupled to a hold terminal of the FIFO 4. An output terminal of the FIFO 4 is electrically coupled to an output terminal 53.

Figure 2:
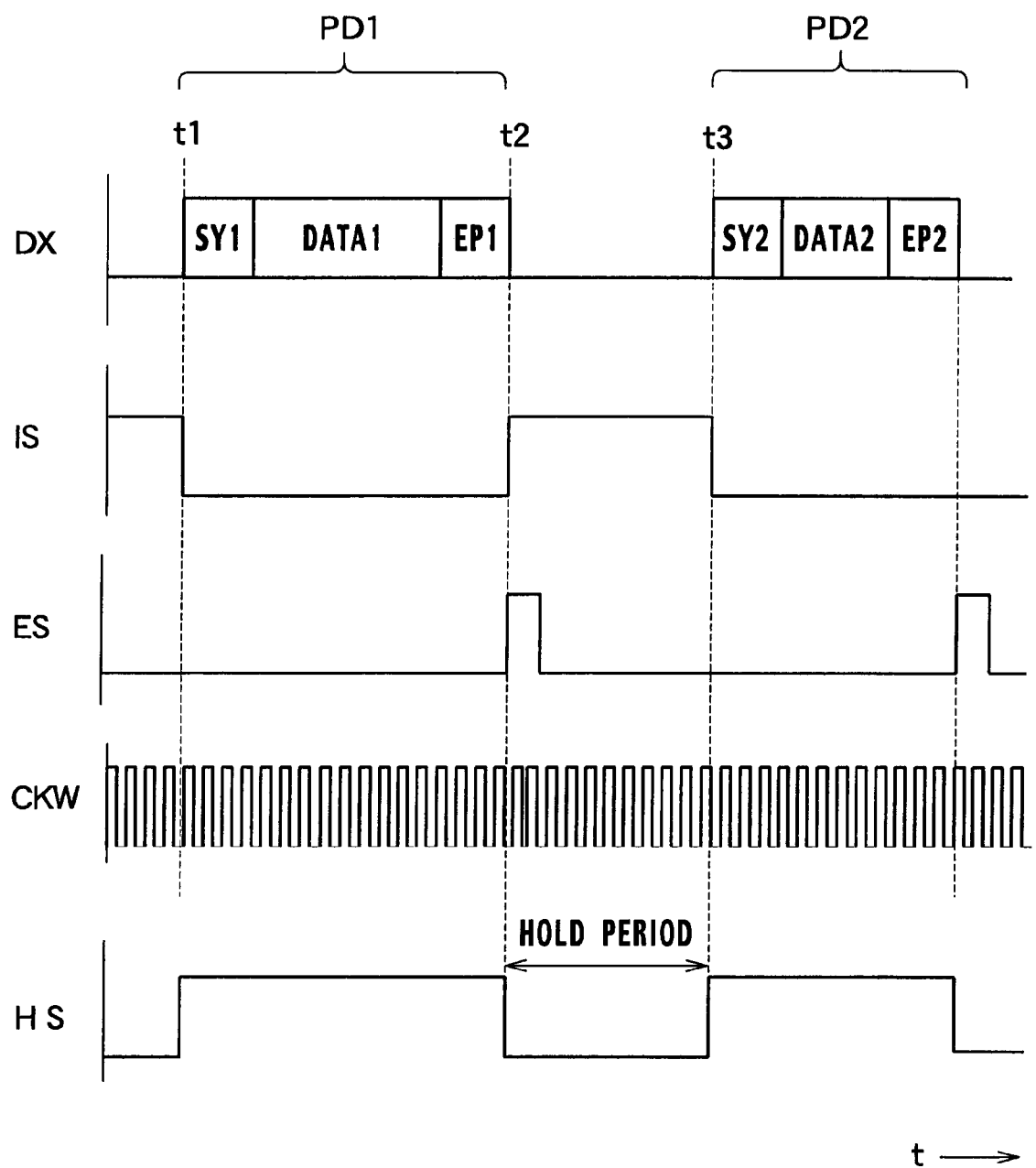
FIG. 2 is a timing chart showing the operation of the serial data receiver 10a according to the first embodiment.

FIG. 2 is a timing chart showing the operation of the serial data receiver 10a according to the first embodiment. In FIG. 2, the serial data DX of the first embodiment is packet data PD1 including start data SY1, received information DATA1, and end data EP1. The start data SY1 is data to specify a data read start position. The end data EP1 is data to specify a data read end position. The start data SY1, received information DATA1, and end data EP1 correspond to a pair of signal of signal S1 and signal S2 with opposite phase of the signal S2. The signal S1 and signal S2 form the differential signals. The packet data PD1 shown in FIG. 2 is only an exemplary model of the signal group and is classified into functions along a time axis. The packet data PD1 may additionally have redundant data. The packet data PD1 in the following explanation has no redundant data.

(a) At time t1, the serial data receiver 10a receives first packet data PD1 that is a pair signal of signal S1 and signal S2 with opposite phases of the signal S1. The signals S1 and S2 are received at the input terminals 51 and 52 of the differential receiver 1, respectively. Then, the differential receiver 1 provides, from the output terminal thereof, a differential signal of the signals S1 and S2 as received serial data RX. The tracking circuit 3 provides a synchronous clock signal CKW by tracking the clock signal CKR with the received serial data RX, as well as serial data DX synchronized with the synchronous clock signal CKW. Upon receiving the signals S1 and S2 of opposite phases, the idle detector 5 provides a low-level idle signal IS as shown in FIG. 2. From the time t1 to the end of reception of the first packet data PD1, the FIFO 4 sequentially stores the serial data DX in the register thereof while counting up the write address pointer in response to transition in the synchronous clock signal CKW. Further, the FIFO 4 provides the data stored in the register to the output terminal 53 while counting up the read address pointer in response to transition in the clock signal CKR.

(b) Thereafter, at time t2, end data EP1 of the serial data RX terminates, and the data end detector 6 provides a data end signal ES. The data end signal ES in this embodiment is a one-shot pulse signal as shown in FIG. 2. Also in FIG. 2, the hold controller 7 provides the FIFO 4 with a hold signal HS at the timing when the data end signal ES is provided. Upon receiving the hold signal HS, the FIFO 4 shifts to an input prohibited state and keeps a current count value of the write address pointer. At this time, the idle detector 5 makes the idle signal IS high.

(c) At time t3, second packet data PD2 is provided. As shown in FIG. 2, the idle detector 5 stops the idle signal IS by making the idle signal IS low. When the output of the idle detector 5 becomes low, the hold controller 7 stops the hold signal HS to release the input prohibited state of the FIFO 4.

According to the serial data receiver of the first embodiment, the data end detector 6 detects the end of the data DX provided by the tracking circuit 3 and provides the data end signal ES. The idle detector 5 receives signals supplied to the differential receiver 1 and detects an idle period of the signals to provide the idle signal IS of high level. According to the signals ES and IS, the hold controller 7 provides the hold signal HS to stop the operation of the FIFO 4 for a given period. During the given period, the data writing operation of the FIFO 4 is stopped, so that a proper correspondence between the serial data DX to be written in the FIFO 4 and a write address pointer value in the FIFO 4 is maintained even if narrow pulses are generated due to noise.

In this way, the serial data receiver according to the first embodiment is capable of maintaining a proper relationship between serial data DX to be stored in the FIFO 4 and a write address pointer value in the memory 4 even if noise affects to received serial data RX to change the intervals of a synchronous clock signal CKW.

Second Embodiment

Figure 3:
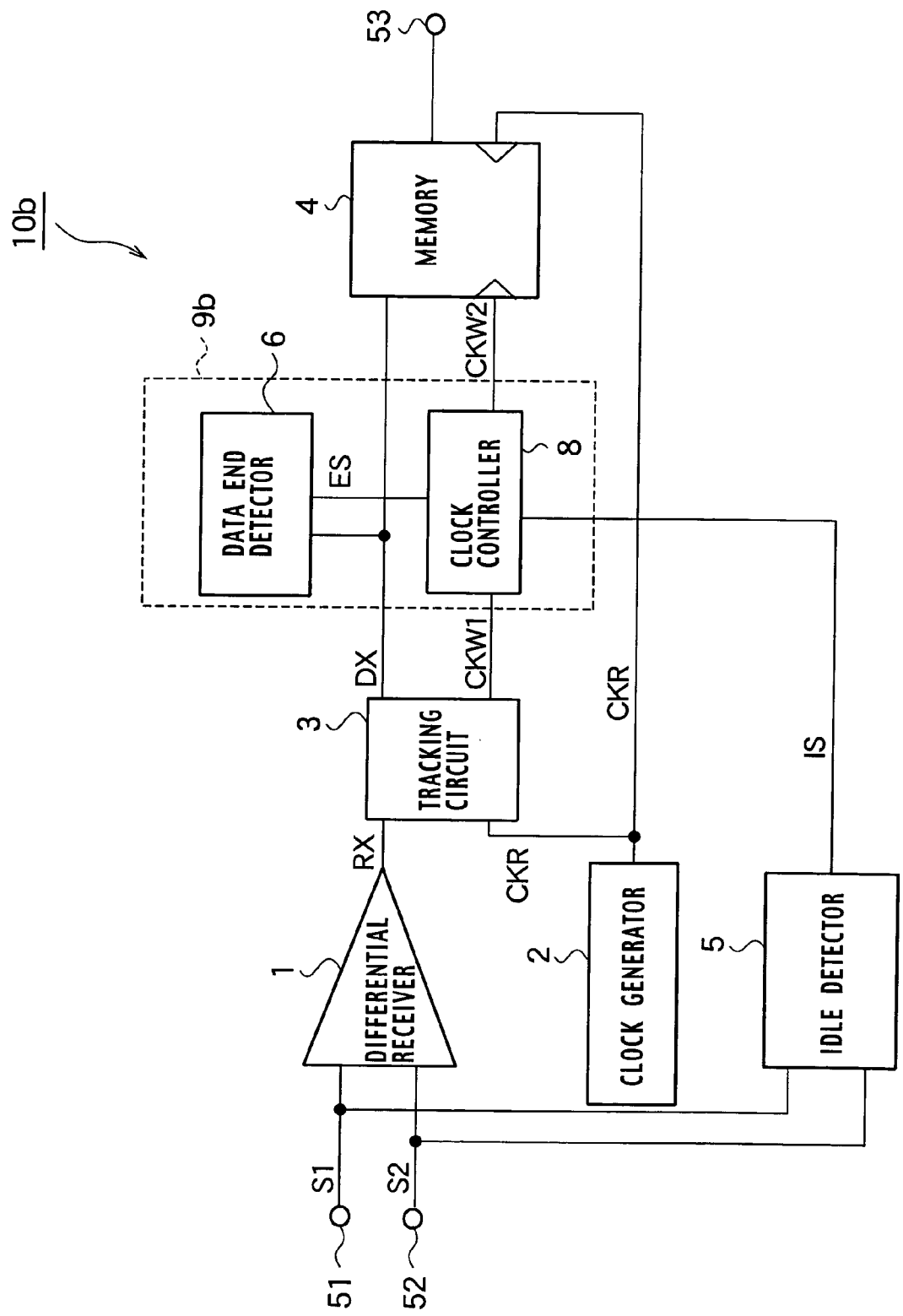
FIG. 3 shows a serial data receiver according to a second embodiment of the present invention.

FIG. 3 shows a serial data receiver according to a second embodiment of the present invention. This serial data receiver 10b includes a data protector 9b having a data end detector 6 and a clock controller 8. Unlike the first embodiment that connects the hold controller 7 to the hold terminal of the FIFO 4, the second embodiment connects the clock controller 8 between a second output terminal of a tracking circuit 3 and a clock terminal of a memory (FIFO) 4.

Figure 4:
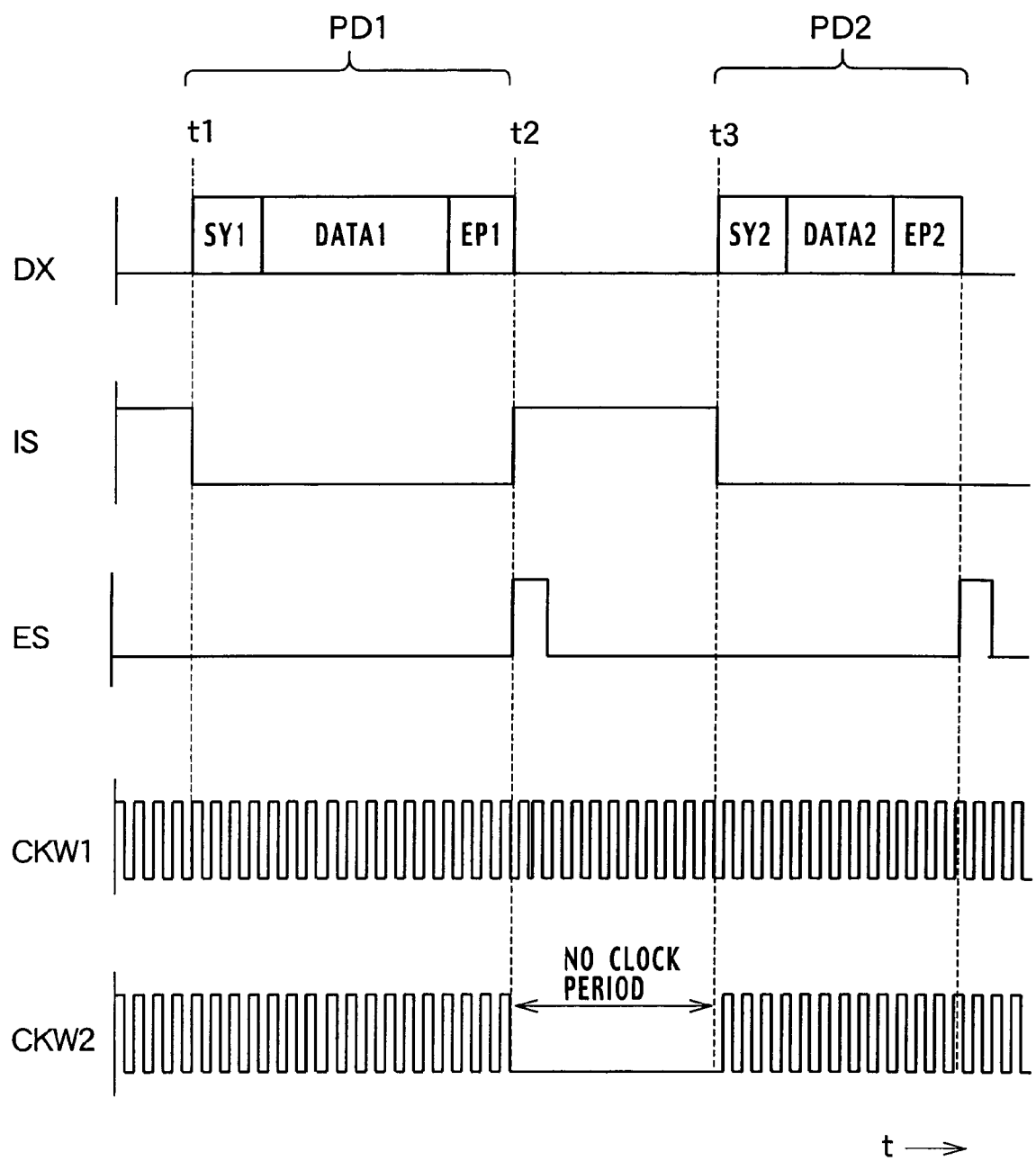
FIG. 4 shows the operation of the serial data receiver 10b according to the second embodiment.
Figure 5:
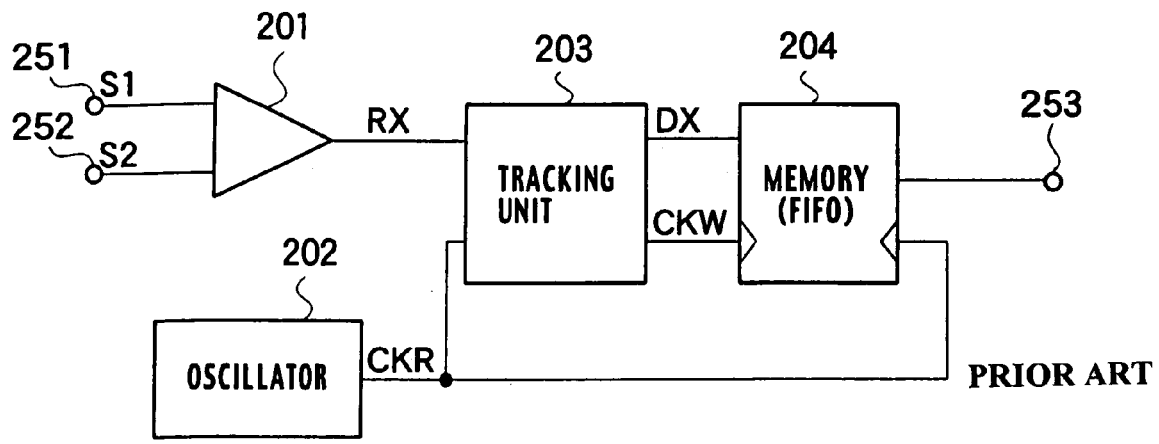
FIG. 5 shows a serial data receiver according to a related art.
Figure 6:
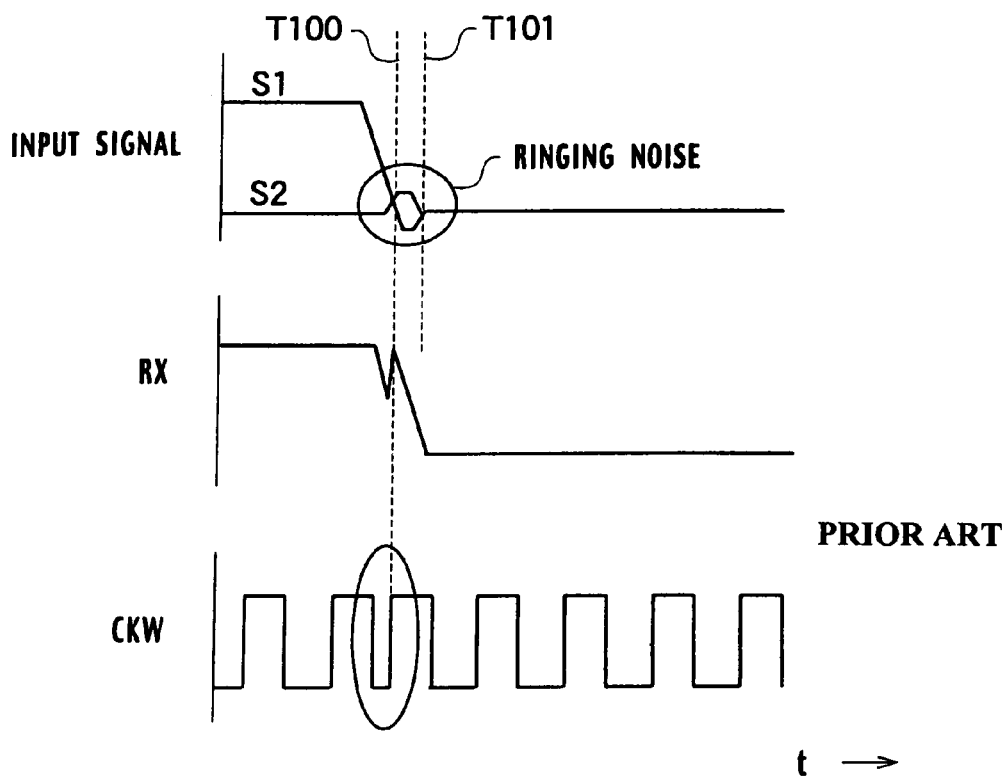
FIG. 6 is a timing chart showing the operation of the serial data receiver according to the related art.

FIG. 4 shows the operation of the serial data receiver 10b according to the second embodiment.

(a) At first, at time t1, the serial data receiver 10b receives first packet data PD1 that is a pair signal of signal S1 and signal S2. The signal S1 is received at a first input terminal 51 and the signal S2 is received at a second input terminal 52. Then, a differential receiver 1 provides, from an output terminal thereof, a differential signal of the first and second signals S1 and S2 as received serial data RX.

The tracking circuit 3 provides a synchronous clock signal CKW1 by tracking a clock signal CKR provided by a phase-locked oscillator 2 with the received serial data RX, as well as serial data DX synchronized with the synchronous clock signal CKW1. Upon receiving the first and second signals S1 and S2 of opposite phases, an idle detector 5 provides a low-level idle signal IS as shown in FIG. 4. From the time t1 to the end of reception of the first packet data PD1, the clock controller 8 provides the synchronous clock signal CKW1 as a second synchronous clock signal CKW2 as shown in FIG. 4. In response to transition in the second synchronous clock signal CKW2, the FIFO 4 sequentially stores the serial data DX in a register of the FIFO 4 while counting up a write address pointer. Further, the FIFO 4 provides the data stored in the register to an output terminal 53 while counting up a read address pointer in response to transition in the clock signal CKR.

(b) Thereafter, at time t2, the reception of end data EP1 of the serial data RD1 terminates, and the data end detector 6 provides a data end signal ES in this embodiment is a one-shot pulse signal as shown in FIG. 4. At the timing of providing the data end signal ES, the clock controller 8 stops providing the second synchronous clock signal CKW2 as shown in FIG. 4. When the second synchronous clock signal CKW2 is stopped, the FIFO 4 keeps a current count value of the write address pointer, and the idle detector 5 makes the idle signal IS high.

(c) At time t3, second packet data PD2 is received, and the idle detector 5 stops the idle signal IS by making it low as shown in FIG. 4. When the output of the idle detector 5 becomes low, the clock controller 8 again provides the second synchronous clock signal CKW2.

In this way, according to the serial data receiver of the second embodiment, the data end detector 6 detects an end of data DX provided by the tracking circuit 3 and provides the data end signal ES. The idle detector 5 receives the signals supplied to the differential receiver 1 and detects an idle period of the signals. The clock controller 8 receives the clock signal CKW1 from the tracking circuit 3 and provides the clock signal CKW2 that involves a suspended period during which the clock signal CKW1 is stopped. During the suspended period, since the clock signal is not provided for the FIFO 4, the data writing operation of the FIFO 4 is suspended. Therefore, a proper relationship between serial data DX to be stored next time in the FIFO 4 and a write address pointer value in the FIFO 4, even if noise is overlaid on received serial data to generate narrow pulses.

According to the serial data receiver of the second embodiment, a correct correspondence is maintained between serial data to be stored in the FIFO 4 and a write address pointer value in the FIFO 4, even if noise is overlaid on received serial data RX to vary the intervals of the synchronous clock signal CKW1.

Other Embodiments

Although the present invention has been explained in connection with the first and second embodiments, these embodiments and the descriptions and accompanying drawings that form a part of the disclosure are not intended to limit to the present invention. Various alternatives, other embodiments, and further operational techniques of the present invention will be apparent for those skilled in the art from the disclosure.

For the first and second embodiments mentioned above, the phase-locked oscillator 2 may be a PLL. The oscillator 2, however, is not limited to the PLL. It may be any other oscillation source if it can provide a phase-stabilized signal.

The memory 4 shown in FIGS. 1 and 3 is a first-in, first-out (FIFO) memory. The memory 4 may be any other memory that can separately and simultaneously control write and read addresses.

In summary, the present invention provides a serial data receiver and a semiconductor integrated circuit capable of maintaining a proper correspondence between serial data to be stored in a memory and a write address pointer value in the memory even if noise is overlaid on received serial data to change the intervals of a synchronous clock signal.

What is claimed is:

1. A serial data receiver comprising:
   a differential receiver configured to receive first and second signals of opposite phases to provide a differential signal of the first and second signals as received serial data;
   a clock generator configured to generate a clock signal;
   a tracking circuit configured to receive the received serial data and the clock signal to generate a synchronous clock signal based on the clock signal by tracking the received serial data, the tracking circuit configured to generate a synchronous serial data synchronized with the synchronous clock signal;
   an idle detector configured to receive the first signal and the second signal, the idle detector configured to detect an idle period of the first and second signals to provide an idle signal;
   a memory configured to store the serial data in response to transitions in the synchronous clock signal, the memory configured to provide the stored data in response to transitions in the clock signal, the memory configured to stop storing based on a hold signal; and
   a data protector configured to receive the idle signal to generate the hold signal, the data protector configured to provide the hold signal for the memory.

2. The serial data receiver of claim 1, wherein:
   the idle detector provides the idle signal when the first and second signals become in-phase.

3. The serial data receiver of claim 1, wherein:
   The memory stores the serial data into a register in the memory.

4. The serial data receiver of claim 1, wherein:
   the clock generator is a phase-locked loop oscillator.

5. The serial data receiver of claim 1, wherein:
   the data protector provides a hold signal that puts the memory in an input prohibited state from the detection of an end of the serial data to the stoppage of the idle signal.

6. The serial data receiver of claim 1, wherein the data protector comprises:
   a data end detector configured to receive the synchronous serial data to detect an end of the synchronous serial data, the data end detector configured to provide a data end signal based on the end of the synchronous serial data; and
   a hold controller configured to receive the idle signal and the data end signal to generate hold signal, the hold controller configured to provide the hold signal to stop storing of the memory from a timing that detection of data end based on the data end signal to a timing that detection of next data based on the idle signal.

7. A serial data receiver comprising:
a differential receiver configured to receive first and second signals of opposite phases to provide a differential signal of the first and second signals as received serial data;
a clock generator configured to generate a clock signal;
a tracking circuit configured to receive the received serial data and the clock signal to generate a synchronous clock signal based on the clock signal by tracking the received serial data, the tracking circuit configured to generate a synchronous serial data synchronized with the synchronous clock signal;
an idle detector configured to receive the first signal and the second signal, the idle detector configured to detect an idle period of the first and second signals to provide an idle signal;
a memory configured to receive the synchronous clock signal to store the serial data in response to transitions in the synchronous clock signal, the memory configured to provide the stored data in response to transitions in the clock signal; and
a data protector configured to receive the synchronous clock signal and the idle signal to provide the memory with the synchronous clock signal, the data protector configured to stop providing the memory with the synchronous clock signal based on the idle signal.

8. The serial data receiver of claim 7, wherein:
the idle detector provides the idle signal when the first and second signals become in-phase.

9. The serial data receiver of claim 7, wherein:
The memory stores the serial data into a register in the memory.

10. The serial data receiver of claim 7, wherein:
the clock generator is a phase-locked loop oscillator.

11. The serial data receiver of claim 7, wherein:
the data protector stops providing the memory with the synchronous clock signal from detecting the end of synchronous serial data to the end of the idle period.

12. The serial data receiver of claim 7, wherein the data protector comprises:
a data end detector configured to receive the synchronous serial data to detect an end of the synchronous serial data, the data end detector configured to provide a data end signal based on the end of the synchronous serial data; and
a clock controller configured to receive the idle signal and the data end signal to generate the suspended clock signal, the clock controller configured to provide the suspended clock signal to stop operation of the memory from a timing that detection of data end based on the data end signal to a timing that detection of next data based on the idle signal.

* * * * *